United States Patent [19]

Tanner

[11] Patent Number: 4,826,695

[45] Date of Patent: May 2, 1989

[54] BEVERAGE INFUSION DEVICE AND METHOD OF USE

[76] Inventor: Joseph Tanner, 117 Schenck Ave., Great Neck, N.Y. 11021

[21] Appl. No.: 245,917

[22] Filed: Sep. 16, 1988

Related U.S. Application Data

[63] Continuation of Ser. No. 844,313, Mar. 26, 1986, abandoned.

[51] Int. Cl.[4] ............................ A23F 5/24; B65B 29/02
[52] U.S. Cl. ............................................ 426/77; 426/78; 426/79; 426/80; 426/82; 426/83; 426/433; 426/435; 99/287; 99/295; 99/323.2
[58] Field of Search ...................................... 426/77–84, 426/477, 433, 435, 67, 591, 595, 85, 86; 99/287, 323.2, 295; 206/0.5

[56] References Cited

U.S. PATENT DOCUMENTS

| | | | |
|---|---|---|---|
| 489,468 | 1/1893 | Dillingham | 426/82 |
| 2,123,054 | 7/1938 | Lamb et al. | 426/80 |
| 2,962,201 | 11/1960 | Brillis et al. | 426/80 |
| 3,193,388 | 7/1965 | Conrey | 426/80 |
| 3,275,448 | 9/1966 | Sommer | 426/78 |
| 3,730,737 | 5/1973 | Harvey et al. | 426/85 |
| 3,833,740 | 9/1974 | Schmidt | 426/80 |
| 3,935,318 | 1/1976 | Mihailide | 426/80 |
| 4,025,655 | 5/1977 | Whyte et al. | 426/77 |
| 4,061,782 | 12/1977 | Baxter | 426/86 |
| 4,186,215 | 1/1980 | Buchel | 426/86 |
| 4,211,156 | 7/1980 | Zimmermann | 426/80 |
| 4,232,502 | 11/1980 | Lucas | 426/86 |
| 4,278,691 | 7/1981 | Donarumma et al. | 426/80 |
| 4,306,492 | 12/1981 | Zimmermann | 426/80 |
| 4,410,550 | 10/1983 | Gaskill | 426/77 |
| 4,414,198 | 11/1983 | Michaelson | 426/86 |
| 4,443,481 | 4/1984 | Donarumma et al. | 426/77 |
| 4,460,612 | 7/1984 | Saleeb et al. | 426/86 |
| 4,465,697 | 8/1984 | Brice et al. | 426/80 |

FOREIGN PATENT DOCUMENTS

| | | | |
|---|---|---|---|
| 528144 | 5/1954 | Belgium | 426/82 |
| 2032166 | 1/1972 | Fed. Rep. of Germany | 426/77 |
| 2264208 | 7/1974 | Fed. Rep. of Germany | 426/77 |
| 2327264 | 1/1975 | Fed. Rep. of Germany | 426/77 |
| 18325 | 1/1892 | United Kingdom | 426/80 |
| 1601335 | 10/1981 | United Kingdom | 426/77 |
| 2076628 | 12/1981 | United Kingdom | 426/86 |

*Primary Examiner*—Steven Weinstein
*Attorney, Agent, or Firm*—Henry R. Lerner

[57] ABSTRACT

A beverage infusion device for preparing a beverage such as coffee includes a gas-liquid chamber permeable to air and water which contains an infusible, insoluble dry beverage substance containing edible, soluble food solids, such as coffee particles, and a carbon dioxide source which releases carbon dioxide when immersed in liquid, such as water. When the infusion device is immersed in water, the carbon dioxide source, preferably situated beneath the coffee particles, releases carbon dioxide. The carbon dioxide bubbles up through the coffee particles, momentarily suspending and agitating the coffee particles. Maximum contact between water and coffee particles is achieved and the edible, soluble food solids are quickly extracted from the coffee particles to form a hot beverage.

Also disclosed is a beverage infusion device including a percolator within a gas-liquid chamber permeable to air and water containing an indusible, insoluble dry beverage substance such as coffee particles. When the beverage infusion device is repeatedly immersed in and removed from water, water enters into the gas-liquid chamber through the percolator at a point above the coffee particles, drains over and through the coffee particles and out of the gas-liquid chamber. A disposable, miniature percolator for brewing a single cup or limited number of cups of a hot beverage such as coffee is thus provided.

15 Claims, 3 Drawing Sheets

BEVERAGE INFUSION DEVICE AND METHOD OF USE

This is a continuation of copending application Ser. No. 844,313 filed on Mar. 26, 1986, now abandoned.

BACKGROUND OF THE INVENTION

There are a diversity of devices and methods for transforming an infusible beverage substance such as ground coffee into a tasty, hot drink. Many attempts have been made to facilitate the preparation of a single cup or limited number of cups of a hot beverage such as coffee in an efficient and tidy manner.

U.S. Pat. No. 3,833,740 to Schmidt discloses a single portion coffee pack. The pack constitutes a permeable filter defining a chamber containing ground coffee which can be immersed in a cup or pot of hot water. Coffee is brewed in much the same way tea is with a tea bag. Water permeates in and out of the pack, extracting edible, soluble food solids from the ground coffee. An external sheath preserves freshness of the pack contents until the sheath is removed manually just prior to immersion of the pack in hot water. The pack contains, beneath the coffee chamber, an air pocket. When the pack is immersed in water, air escapes from the air pocket upwardly into and through the chamber containing the coffee, agitating and turning the coffee. This enables the hot water to contact a greater surface area of the ground coffee, facilitating a more effective penetration of the coffee and a quicker extraction of the edible food solids from the coffee. Agitation is minimal, however, and a more effective beverage infusion device is highly desirable.

U.S. Pat. No. 4,410,550 to Gaskill involves a similar attempt to prepare a single cup of coffee by air agitation in an air-water chamber. Ground, roasted coffee is enclosed in a chamber permeable to air and water. A conduit or tube is connected to the bottom of the chamber, with the connected end covered by a mesh material to prevent entry of ground coffee from the chamber into the tube. The tube extends up alongside the chamber to a point above the water level of a normal cup of coffee. Once the chamber is immersed in hot water, the user blows through the tube and air flows through the tube into the chamber and through the ground coffee, "violently carrying coffee particles and water solubles with it." While the Gaskill invention promotes a more efficient brewing process, ultimately, the effectiveness of the device resides with the user, who must develop through trail and error the proper amount and velocity of air to send shooting through the air conduit and hence into the chamber. Too much enthusiasm and the user can burst the walls of the chamber from within, spill water, or produce similar undesirable results.

Accordingly, the need still exists for a device and method of brewing a single cup or limited number of cups of a hot beverage such as coffee which will not require the user to develop any special technique and will effectively and efficiently permit extraction of the soluble food solids from coffee and the like to the water, thus providing a delicious hot beverage.

SUMMARY OF THE INVENTION

An object of the present invention is to provide a device and method for making a liquid beverage from an infusible, insoluble dry beverage substance which efficiently and effectively extracts soluble, edible food solids from the insoluble dry beverage substance when immersed in water.

A further object of the present invention is to provide a device and method for making a liquid beverage from an infusible, insoluble dry beverage substance containing soluble, edible food solids in an easy and convenient manner which permits selective control of the number of liquid beverages prepared and the taste of each liquid beverage in terms of strength.

Yet another object of the present invention is to provide a device and method for making a liquid beverage from an infusible, insoluble dry beverage substance containing soluble edible food solids wherein the dry beverage substance is maintained at peak freshness until use.

Another object of the present invention is to provide a device and method for making a liquid beverage from an infusible, insoluble dry beverage substance containing soluble edible food solids which eliminates cumbersome prior art approaches to extracting the soluble, edible food solids when the beverage substance is immersed in water.

To achieve these and other objects, the present invention provides a beverage infusion device comprising a gas-liquid chamber made of a material porous to air and water, the gas-liquid chamber containing a source of carbon dioxide and an infusible, insoluble dry beverage substance containing soluble, edible food solids, the carbon dioxide source being constructed to release carbon dioxide when the beverage infusion device is immersed in liquid to suspend and agitate the infusible, insoluble dry beverage substance to extract the edible food solids from the dry beverage substance, whereby the extracted soluble edible food solids dissolve in the liquid to form a liquid beverage.

One method according to the present invention comprises enclosing an infusible, insoluble dry beverage substance containing soluble, edible food solids and a source of carbon dioxide within a chamber permeable to air and water and immersing the chamber in a potable liquid to release carbon dioxide from the carbon dioxide source, the released carbon dioxide suspending and agitating the infusible, insoluble dry beverage substance, whereby the soluble, edible food solids are extracted from the dry beverage substance and dissolve in the potable liquid to form a liquid beverage.

Preferably, the carbon dioxide source is positioned in the permeable chamber beneath the infusible, dry beverage substance. Additionally, it is preferred that the carbon dioxide source comprises a molecular sieve containing absorbed, gaseous carbon dioxide. The preferred dry beverage substance is coffee.

The present invention further provides a beverage infusion device comprising a gas-liquid chamber made of a material having at least some portions permeable to air and water, the gas-liquid chamber containing an infusible, insoluble dry beverage substance containing soluble, edible food solids, and percolator means adapted to percolate liquid into the gas-liquid chamber, through the infusible, insoluble dry beverage substance and out of the gas-liquid chamber when the beverage infusion device is immersed in and removed from liquid, whereby the percolating liquid agitates the infusible, insoluble dry beverage substance to agitate the dry beverage substance and extract the edible food solids from the dry beverage substance, thereby alowing the edible food solids to dissolve in the liquid to form a liquid beverage.

A further method according to the present invention comprises enclosing an infusible, insoluble dry beverage substance containing soluble, edible food solids within a chamber made of a material having at least some portions permeable to air and water, immersing the chamber in a potable liquid, percolating liquid into the chamber and through the dry beverage substance, and removing the chamber from the liquid, whereby the percolating liquid drains through the dry beverage substance and out of the chamber, thereby agitating the dry beverage substance and extracting the edible food solids from the dry beverage substance to dissolve in the liquid and form a liquid beverage.

Preferably, the dry beverage substance is coffee particles and the immersing, percolating and removing steps are repeated in sequence a plurality of times to insure maximum extraction of the edible food solids from the dry beverage substance.

BRIEF DESCRIPTION OF THE DRAWINGS

The method and apparatus of the present invention will now be described with reference to the accompanying drawings, in which.

DETAILED DESCRIPTION OF THE PREFERRED EMBODIMENTS

Figure 1A:
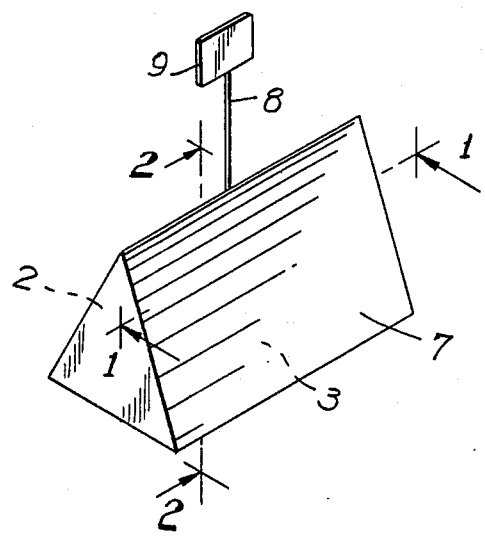
FIG. 1A is a perspective view of a first embodiment of the beverage infusion device of the present invention.

FIG. 1A is a perspective view of a first embodiment of the beverage infusion device of the present invention.

Figure 1:
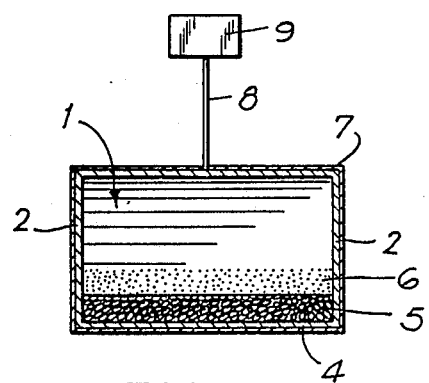
FIG. 1 is a vertical cross-section taken along the line 1—1 of FIG. 1A.
Figure 2:
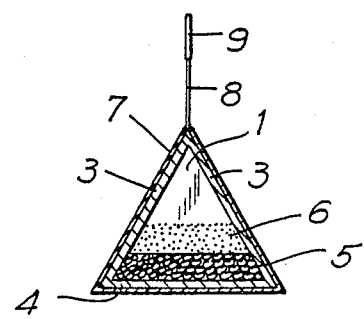
FIG. 2 is a vertical cross-section taken along the line 2—2 of FIG. 1A.

As shown in FIGS. 1 and 2, which are vertical cross-sections taken, respectively, along lines 1—1 and 2—2 of FIG. 1A, a beverage infusion device 10 includes a gas-liquid container or chamber 1. Chamber 1 contains a solid source of carbon dioxide 5 and fresh, fine-ground coffee particles 6. Chamber 1 comprises walls 2, 3 and 4 which are porous or permeable to air and water, but not to the solid carbon dioxide source 5 or the coffee particles 6. Thus, the coffee particles and carbon dioxide source 5 are permanently encased in chamber 1. Carbon dioxide source 5 is preferably situated beneath the coffee particles 6.

Chamber 1 is preferably made of a flexible, net-like inert material, having a mesh size large enough to permit the passage of gaseous carbon dioxide and water, but small enough to confine the coffee particles 6 and solid carbon dioxide source 5 within the chamber. Suitable materials for the permeable chamber 1 include but are not limited to nylon, cloth, paper, polyester, fiberglass, and other well-known water-insoluble, inert, synthetic polymeric materials. Alternatively, chamber 1 may be made of a highly porous filter material or the like, such as the open mesh polymeric netting available from Hercules, Inc. under the trademark Delnet.

The shape of chamber 1 is not critical. While chamber 1 is shown in the various specific embodiments as comprising walls 2, 3, 4, any shape chamber may be employed in the present invention, such as, for example, spherical, trapezoidal, cubic and the like.

The oretically, any solid carbon dioxide source which releases sufficient carbon dioxide when immersed in water to momentarily agitate and suspend the coffee particles 6 can be used in the present invention. The prior art is replete with methods and devices for generating carbon dioxide, e.g. for the purpose of carbonating liquid beverages. However, many prior art systems employing chemical couples either generate objectionably-tasting organic salts in solution along with the carbon dioxide (U.S. Pat. Nos. 3,241,977, 3,467,526, 3,492,671 and 2,742,363) or require complex formulation and a buffer system (U.S. Pat. No. 3,441,417). While such methods would provide adequate agitation in the present invention, they are not practical in creating a beverage for consumption.

Accordingly, it is preferred in the present invention to provide a source for releasing carbon dioxide which will not impart any undesirable taste to the beverage being prepared or require the incorporation of any buffer system.

The carbon dioxide source 5 shown in the embodiment of FIGS. 1 and 2 comprises a solid wafer combining a carbonate and a polymeric acid, preferably thermoplastic and at least slightly soluble, which releases carbon dioxide without producing any objectionable taste or requiring the incorporation of a buffer system. Preparation of such a wafer is fully described in U.S. Pat. No. 3,556,803 to Ehrreich, the disclosure of which is incorporated herein by reference.

Briefly, introduction of the Ehrreich wafer into aqueous solution reacts the carbonate and polymeric acid to produce carbon dioxide and a salt of the polymeric acid. An undesirable taste is not imparted to the solution because the salt reaction product does not go into solution.

As shown in FIG. 1A, the beverage infusion device 10 is encased in an overwrap 7 of inert material impervious to air, water and water vapor to protect the coffee particles 6 and carbon dioxide source 5 from distintegration prior to use. Such over-wraps are well-known and need not be described in detail here.

A conventional string 8 and paper tab 9 are also provided for inserting the device in and removing the device from the aqueous solution to be formed into a beverage.

To use the beverage infusion device shown in FIGS. 1 and 2, the overwrap 7 is removed and the gas-liquid chamber 1, containing coffee particles 6 and carbon dioxide-releasing wafer 5 is submerged in liquid, such as hot water, which forms the aqueous solution for the beverage, preferably in the temperature range of about 180° to about 212° F. Chamber 1 prevents the coffee particles 6 and carbon dioxide-releasing wafer 5 from dispersing into the hot water. Conversely, hot water permeates walls 2, 3, 4 into and out of the chamber 1, contacting coffee particles 6 and wafer 5. Contact of wafer 5 with the hot water reacts the compounds of the wafer, releasing carbon dioxide. The released carbon dioxide bubbles up through the coffee particles, momentarily suspending and agitating the coffee particles. As a result, the edible, soluble food solids of the coffee particles are extracted rapidly and dissolved in the hot water, providing a delicious cup of fresh coffee. The carbon dioxide permeates the walls of the gas-liquid chamber, bubbles up through the liquid outside chamber 1 and escapes into the atmosphere. The carbon dioxide does not carbonate the liquid beverage because, as is well-known in the art, the solubility of carbon dioxide in water decreases with increasing temperature, substantially being eliminated at temperatures above about 110° F. See, in this regard, U.S. Pat. No. 4,025,655 to Whyte, at column 2, lines 24 to 28. After use, the beverage infusion device is disposed of.

Figure 3:
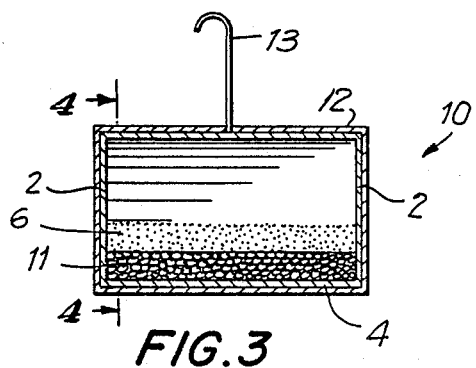
FIG. 3 is a vertical cross-section of a second embodiment of the beverage infusion device of the present invention utilizing a molecular sieve as a carbon dioxide source.
Figure 4:
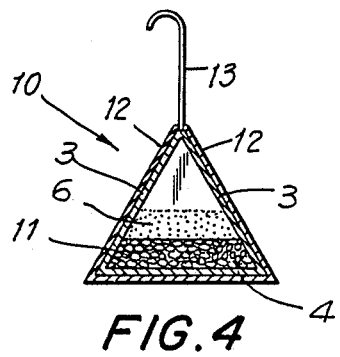
FIG. 4 is a vertical cross-section taken along the line 4—4 of FIG. 3.

FIGS. 3 and 4 illustrate a second embodiment of the beverage infusion device of the present invention.

As shown in FIGS. 3 and 4, where like numerals refer to parts similar to those shown in FIGS. 1A, 1 and 2, a carbon dioxide-releasing source is provided in the form of a molecular sieve 11. Molecular sieve 11 comprises a natural crystalline aluminosilicate containing absorbed gaseous carbon dioxide. The preparation of such molecular sieves are fully described in U.S. Pat. No. 4,025,655 to Whyte et al, the contents of which are incorporated herein by reference, in the context of a beverage carbonation device. Such molecular sieves are commercially available from the Union Carbide Corp.

Briefly, carbon dioxide is released from these molecular sieves by preferential displacement in water.

Molecular sieves range from powders (e.g. 0.5 to 12 microns) to spheres or pellets (up to, for example, ¼ inch). Common molecular sieve forms include extruded pellets (e.g. 1/16 and ⅛ inch diameter) and mesh beads (for example, 8×12, spheres which will pass through an 8-mesh screen but not a 12-mesh screen). They may be molded to any size and shape form with clay or polymeric resin binders. Well-known processes for bonding or molding molecular sieves are fully described, for example, in U.S. Pat. Nos. 3,158,597, and 3,213,164, British Patent No. 994,908 and Belgian Patent No. 627,185, all of which are incorporated herein by reference.

Rate of release of gaseous carbon dioxide form molecular sieves is determined by choice of appropriate pore sizes and physical shapes for the molecular sieves. Different rates and intensities of carbon dioxide release are contemplated in the present invention and depend on the desired degree of activation. Additionally, rate of release of gaseous carbon dioxide may be controlled by coating the sieve with a water soluble material to impede the entry of water into the gas-releasing structure of the sieve. As the soluble coating dissolves during immersion, water comes in contact with the gas-releasing structure, preferentially displacing and releasing carbon dioxide.

Such a sieve may be used to prolong the suspension and agitation of the coffee particles in the beverage infusion device of the present invention. Any non-toxic, water soluble coating compound may be employed in the present invention, preferably polyvinyl alcohol, polyvinyl pyrroirdone, or most preferably hydroxypropyl cellulose. The physical shape and rate and duration of dissolution of the water soluble coating compound is not critical and may be varied depending on the desired rate of carbon dioxide release.

The beverage infusion device shown in FIGS. 3 and 4 operates and is used in the same manner as that shown in FIGS. 1 and 2. Additionally, the gas-liquid chamber 1 of FIGS. 3 and 4 is secured within a frame 12 connected to a handle 13, which together constitute a handle-and-frame assembly for accurately controlling movement of the gas-liquid chamber during immersion to agitate the aqueous solution and enhance blending of the edible food solubles extracted from the dry beverage substance into solution during carbon dioxide release.

Figure 5:
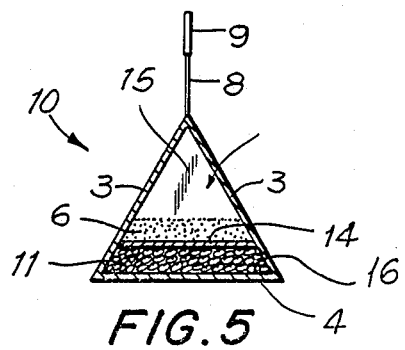
FIG. 5 is a vertical cross-section illustrating a modification of the beverage infusion device shown in FIGS. 3 and 4.
Figure 6:
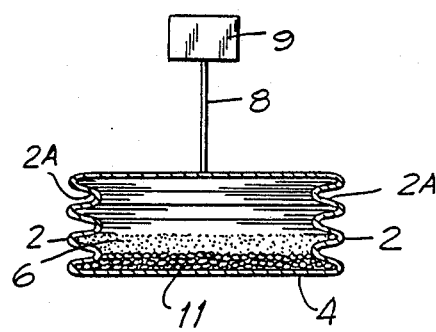
FIG. 6 is a vertical cross-section illustrating another modification of the beverage infusion device shown in FIGS. 3 and 4 before immersion in aqueous solution.
Figure 7:
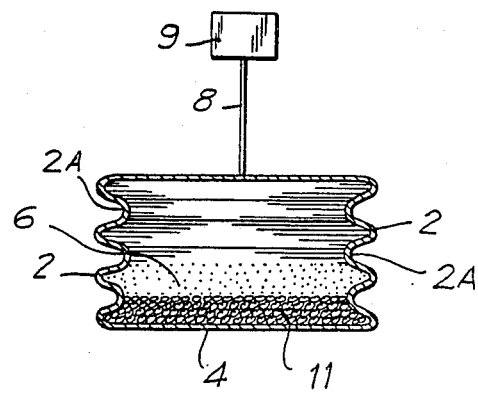
FIG. 7 illustrates the invention shown in FIG. 6 after immersion in aqueous solution.

FIGS. 5 to 7 illustrate modifications which may be incorporated into the beverage infusion device of the present invention.

As shown in FIG. 5, where like numerals refer to parts similar to those shown in earlier drawings, gas-liquid chamber 1 is provided with a medial transverse seal 14 which divides chamber 1 into two compartments 15 and 16. Upper compartment 15 contains the infusible beverage substance 6 and lower compartment 16 contains the carbon dioxide source, shown in FIG. 5 as molecular sieve 11. When medial seal 14 is opened, compartments 15 and 16, and thus their contents, are placed in communication with each other, without destroying the integrity of the chamber 1 material. Techniques are well known in the art for forming such a weak seal 14. The seal preserves the freshness of the coffee particles and carbon dioxide source until just before use.

As shown in FIG. 6, where like numerals refer to parts previously described, side walls 2 are provided with a plurality of circumferential pleats 2A. The chamber 1 contains molecular sieve 11 and infusible beverage substance 6. Pleats 2A are expandable vertically. FIG. 7 illustrates this modified embodiment after repeated immersion in water. Chamber 1 is immersed in water and withdrawn. As the chamber 1 is removed from the water, pleats 2A expand vertically, facilitating the drawing of water through the interior of the chamber as carbon dioxide is released from the molecular sieve 11. This combined action enhances extraction of the soluble, edible food solids from the infusible beverage substance 6. For maximum effect, the chamber 1 preferably is immersed and withdrawn from the water repeatedly, until pleats 2A have completely expanded.

While a carbonate-polymeric acid wafer and molecular sieve have been specifically set forth as carbon dioxide sources, it will be apparent that other carbon dioxide sources may be employed in the present invention. For example, a carbon dioxide-containing cartridge may be used, as well as other carbon dioxide releasing compounds. Carbon dioxide may be generated, for example, either chemically or by preferential displacement by water. Moreover, a combined molecular sieve/chemical couple system or combined carbonate-polymeric acid/chemical coupled system may be employed. Used at low levels with other carbon dioxide-releasing sources, the off-taste of chemical couple systems releasing carbon dioxide is barely noticeable, if at all.

Additionally, while a natural crystalline aluminosilicate molecular sieve has been described, synthetic equivalents, acid resistant molecular sieves, and the like, may be employed as the carbon dioxide source.

The amount and type of infusible beverage substance used in the present invention may be varied. While coffee has been set forth as the preferred insoluble, infusible beverage substance containing soluble, edible food solids, tea and similar insoluble, infusible beverages which are brewed may be employed. The amount of beverage substance employed depends on the final beverage strength desired and the number of cups of hot beverage which it is desired to make with one beverage infusion device.

Additives giving the final beverage a characteristic flavor or appeal may be incorporated with the infusible beverage substance in the gas-liquid chamber of the beverage infusion device. Such additions include, but are not limited to, non-dairy creamers, sugar, artificial sweeteners, and flavorings such as mocha, orange, ameretto, mint, and the like.

Equivalent gases other than carbon dioxide, a combination of gases, a dissolving solid or liquid having a lesser density than water, or a combination of the above, or the like, may be employed to provide the agitation of the infusible beverage substance.

Additionally, the size of the gas-liquid chamber is not critical. Preferably, the gas-liquid chamber is about the average size of a tea bag.

Figure 8A:
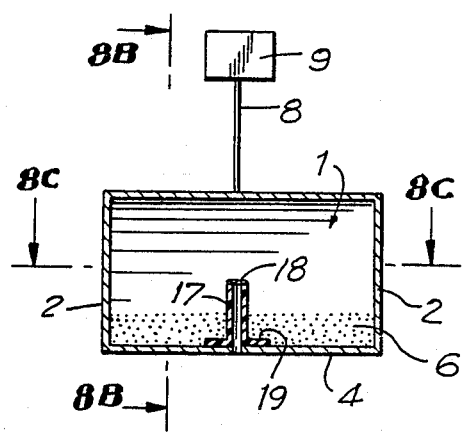
FIG. 8A is a vertical cross-section of a third embodiment of the beverage infusion device of the present invention employing a percolator within the device for an infusible beverage substance.
Figure 8B:
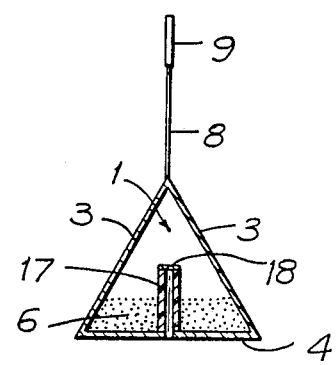
FIG. 8B is a vertical cross-section taken along the line 8B—8B of FIG. 8A.
Figure 8C:
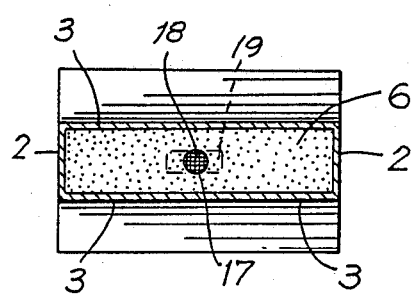
FIG. 8C is a horizontal cross-section taken along the line 8C-8C of FIG. 8A.

FIGS. 8A to 8C illustrate another embodiment of the invention where a percolator for the infusible beverage substance is provided in the gas-liquid chamber. As used in this specification, to "percolate" means to force liquid up through a hollow stem, filter the liquid through the dry beverage substance and return the liquid to a point beneath the dry beverage substance.

As shown in FIGS. 8A to 8C, where like numerals refer to parts previously described, coffee particles 6 are enclosed in permeable gas-liquid chamber 1. A hollow conduit 17, preferably made of plastic, is situated within gas-liquid chamber 1. A top end of conduit 17 rises above the level of coffee particles 6 and has secured thereto a mesh material or screen 18. The bottom end of conduit 17 is secured around its periphery to the inside of chamber 1 by attaching means 19, but otherwise communicates with the outside.

In operation, the beverage infusion device is immersed in water and water permeates the walls 2 and 3 of chamber 1. Water also enters through the bottom end of conduit 17, the conduit 17 itself and the mesh material or screen 18 into the interior of chamber 1, saturating the coffee particles from above. Upon removal of the beverage infusion device from the water, water drains from the coffee particles, carrying edible, soluble solids with it. Immersion and withdrawal are repeated a plurality of times as necessary to achieve the desired coffee strength. The result is the creation of a miniature percolator within the chamber 1. After use, the beverage infusion device is disposed of.

Mesh material or screen 18 allows the substantially unimpeded entry of water into chamber 1, but has a small enough mesh to prevent the escape of any coffee particles from chamber 1 through conduit 17. The lower end of conduit 17 may alternatively be covered by a mesh material or screen similar to screen 18.

Figure 9:
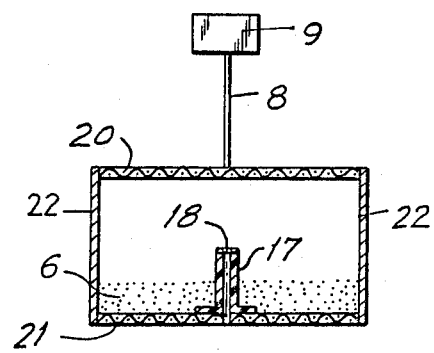
FIG. 9 is a vertical cross-section similar to FIG. 8A illustrating a modification of the beverage infusion device shown in FIGS. 8A to 8C.

FIG. 9 shows a modification of the embodiment shown in FIGS. 8A to 8C. As shown in FIG. 9, the gas-liquid chamber 1 is constructed with an impermeable wall section 22 surrounded by permeable mesh material wall sections 20 and 21. Mesh wall sections 20 and 21 are constructed of a material described previously as suitable for the chamber 1.

The FIG. 9 embodiment operates in essentially the same manner as the embodiment shown in FIGS. 8A to 8C. After immersion, water enters up through conduit 17 into gas-liquid chamber 1, draining out through the bottom mesh section 21 after passing through the coffee particles 6. The device operates as a miniature percolator. The flexible, impermeable wall section 22 prevents drainage of water through the side walls of chamber 1 and insures drainage of all water through the bottom mesh section 21. This insures maximum contact of water and coffee particles. Top mesh section 20 prevents the formation of any vacuum within chamber 1 during drainage and thus facilitates drainage through bottom mesh section 21. After use, the beverage infusion device can be disposed of.

The modifications described in relation to the embodiments shown in FIGS. 3 to 7 may be employed in the embodiments shown in FIGS. 8A-8C and 9.

It will be understood that the specification and preferred embodiments are illustrative but not limitative of the present invention. Other embodiments within the spirit and scope of the invention will suggest themselves to those skilled in the art.

What is claimed is:

1. A beverage infusion device for brewing a hot beverage such as coffee comprising, a gas-liquid chamber made of a material porous to air and water, the gas-liquid chamber containing and retaining an infusible insoluble, dry beverage substance containing soluble, edible food solids and a separate source of carbon dioxide other than the beverage substance, the carbon dioxide source consisting essentially of a molecular sieve containing absorbed, gaseous carbon dioxide, said molecular sieve being structured and positioned in said chamber and containing said adsorbed gaseous carbon dioxide in an amount sufficient to release carbon dioxide when the beverage infusion device is immersed in hot water to suspend and agitate the infusible, insoluble dry beverage substance sufficient to extract the edible food solids from the dry beverage substance substantially without carbonating the water, such that the extracted soluble edible food solids but not the carbon dioxide dissolve in the water to form a non-carbonated hot liquid beverage.

2. A beverage infusion device as in claim 1, wherein the dry beverage substance comprises coffee particles.

3. A beverage infusion device as in claim 2, wherein the separate carbon dioxide source is enclosed in the gas-liquid chamber beneath the dry beverage substance.

4. A beverage infusion device as in claim 2, further including a medial transverse seal dividing the gas-liquid chamber into two compartments, one compartment containing the coffee particles and another compartment containing the separate carbon dioxide source, and means for opening the medial transverse seal to permit communication between the coffee particles and the separate carbon dioxide source.

5. A beverage infusion device as in claim 2, wherein the gas-liquid chamber is enveloped in a removable material wrapping substantially impervious to air, water and water vapor.

6. A beverage infusion device as in claim 2, wherein the gas-liquid chamber is made of a material comprising a water-insoluble, flexible net of inert materials having a mesh size permitting the escape of carbon dioxide but preventing the escape of coffee particles and separate carbon dioxide source.

7. A beverage infusion device as in claim 2, further including a frame and handle assembly connected to the gas-liquid chamber for agitating the gas-liquid chamber when immersed in water.

8. A beverage infusion device as in claim 2, wherein the gas-liquid chamber includes a plurality of circumferential pleats which expand when the gas-liquid chamber is repeatedly immersed in and removed from water to enhance the release of edible food solids from the coffee particles.

9. A method for preparing a hot liquid beverage such as coffee comprising enclosing an infusible, insoluble dry beverage substance containing soluble, edible food solids and a separate source of carbon dioxide other than the beverage substance within a chamber permeable to air and water and capable of retaining said infusible, insoluble dry beverage substance, the separate source of carbon dioxide consisting essentially of a molecular sieve containing absorbed, gaseous carbon dioxide, said molecular sieve being structured and positioned in said chamber and containing said absorbed gaseous carbon dioxide in an amount sufficient to release carbon dioxide when the chamber is immersed in hot water to suspend and agitate the infusible, insoluble dry beverage substance and immersing the chamber in water at a temperature sufficient to release carbon dioxide from the separate carbon dioxide source, the released carbon dioxide suspending and agitating the infusible, insoluble dry beverage substance substantially without carbonating the water, such that the soluble edible food solids are extracted from the dry beverage substance and dissolve in the water to form a non-carbonated hot liquid beverage.

10. A method according to claim 9, wherein the dry beverage substance is coffee particles.

11. A method according to claim 10, wherein the separate source of carbon dioxide is enclosed within the air and water-permeable chamber beneath the coffee particles.

12. A method according to claim 10, further including, after said enclosing and prior to said immersing, enclosing the air and water-permeable chamber containing the separate carbon dioxide source and coffee particles in a removable material wrapping substantially impervious to air, water and water vapor to preserve freshness of the coffee particles and separate carbon dioxide source until immersion.

13. A method according to claim 10, further including agitating the air and water-permeable chamber during immersion in the water to enhance extraction to the edible food solids from the immersed coffee particles.

14. A method according to claim 10, further including removing the air and water-permeable chamber from the water when a desired coffee strength is attained.

15. A method according to claim 9, wherein the chamber is immersed in water at a temperature ranging from about 180° F. to 212° F.

* * * * *